(12) United States Patent
Wong et al.

(10) Patent No.: US 7,847,009 B2
(45) Date of Patent: *Dec. 7, 2010

(54) CARBONACEOUS MATERIAL WITH DISSOCIATED AGGREGATE SIZE AND PARTICLE SIZE DISTRIBUTION AND IMPROVED DISPERSIBILITY

(75) Inventors: Weidong Wong, Marietta, GA (US); Charles R. Herd, Woodstock, GA (US); Jorge A. Ayala, Yorkville, IL (US)

(73) Assignee: Columbian Chemicals Company, Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/272,396

(22) Filed: Nov. 17, 2008

(65) Prior Publication Data

US 2009/0163617 A1 Jun. 25, 2009

Related U.S. Application Data

(63) Continuation-in-part of application No. 11/769,875, filed on Jun. 28, 2007, and a continuation of application No. 10/845,368, filed on May 13, 2004, now Pat. No. 7,238,741.

(51) Int. Cl.
*C08K 3/04* (2006.01)
(52) U.S. Cl. .............. 524/496; 423/449.1; 423/449.2; 524/495
(58) Field of Classification Search .............. 423/449.1, 423/449.2; 524/495, 496
See application file for complete search history.

(56) References Cited

U.S. PATENT DOCUMENTS

| | | |
|---|---|---|
| 3,959,008 A | 5/1976 | Warner et al. |
| 4,228,143 A | 10/1980 | Cheng et al. |
| 4,929,280 A | 5/1990 | Wideman et al. |
| 5,124,396 A | 6/1992 | Branan, Jr. et al. |
| 6,608,132 B1 | 8/2003 | Bomo et al. |
| 7,238,741 B2 | 7/2007 | Wang et al. |
| 2005/0256249 A1 | 11/2005 | Wang et al. |

FOREIGN PATENT DOCUMENTS

| | | |
|---|---|---|
| EP | 872514 | 10/1998 |
| EP | 10195972 | 5/2001 |
| JP | 62290738 | 12/1987 |
| JP | 2001181534 | 7/2001 |
| WO | WO 91/13944 | 9/1999 |

OTHER PUBLICATIONS

Lewis, Richard J., Sr. Hawley's Condensed Chemical Dictionary, Fourteenth Edition. John Wiley & Sons, Inc. 2002.
Material Data Sheet VULCAN 6 (online), Cabot Corp, 1995-2005 (retrieved on Oct. 12, 2005. Retrieved from the Internet URL:http://www.cabot-corp.com/cws/product.nsf/PDSDOCKEY/---V6?OpenDocuments&bc=Products+%26+Markets/Industrial+Rubber+Products/DataSheets+Sheets+%26+MSDS&bcn=23/4294967141/30330&entry=market.
Beaucage, G., Rane S., Schaefer, D.W., Long, G., Fischer, D. Morthology of Polyethylene-Carbon Black Composites; Correspondence to;G. Beaucage, Journal of Polymer Science: Part B: Polymer physics, vol. 37, 1105-1119(1999) 1999 John Wiley & Sons, Inc. CCC 0687-6266/99/11105-15.

*Primary Examiner*—Peter Szekely
(74) *Attorney, Agent, or Firm*—Ballard Spahr LLP (57) ABSTRACT

The present invention claims that a carbon black with unique morphological properties provides improved carbon black dispersion and improved rubber compound properties, such as improved fatigue life and abrasion resistance. The carbon black of current invention has a ratio of aggregate size HI and particle size HI greater than 1.70, the surface area STSA of 100-180 $M^2$/g and the structure OAN less than 140 cc/100 g.

27 Claims, 2 Drawing Sheets

CARBONACEOUS MATERIAL WITH DISSOCIATED AGGREGATE SIZE AND PARTICLE SIZE DISTRIBUTION AND IMPROVED DISPERSIBILITY

CROSS-REFERENCE TO RELATED APPLICATIONS

This application is a continuation-in-part of U.S. application Ser. No. 11/769,875, filed on Jun. 28, 2007, which was a continuation of U.S. application Ser. No. 10/845,368, filed May 13, 2004, which has since issued as U.S. Pat. No. 7,238,741, on Jul. 3, 2007, hereby incorporated herein by reference in their entirety for all of their teachings.

STATEMENT REGARDING FEDERALLY SPONSORED RESEARCH OR DEVELOPMENT

Not applicable

REFERENCE TO A "MICROFICHE APPENDIX"

Not applicable

BACKGROUND

Carbon black is an engineered, particulate elemental carbon found in countless items used on a daily basis. It is an essential ingredient in, for example, tires and other mechanical rubber goods, improving their strength durability, and overall performance. It also is used as a pigment in, for example, printing links, paints, and plastics.

Carbon blacks for rubber applications are typically identified by a four-character "N" or "S" number, e.g., NXXX or SXXX. The category (grade) is determined by ASTM D1765. The first character of the category gives some indication of the influence of the carbon black on the rate of cure of a typical rubber formulation containing the black. The second character gives information on the average surface area of the carbon black. blacks with the same second character are grouped into a series ending in "00", e.g., N200 series. The last two characters are assigned arbitrarily. Iodine absorption number (Iodine no.) (ASTM D1510, ISO 1304) has been the primary indication of surface area for defining different grades. Nitrogen surface area (NSA, ASTM D6556) and statistical thickness surface area (STSA, ASTM D6556) are now used more frequently for surface area. N-dibutyl phthalate absorption (DBPA) (ASTM D2414, ISO 4656/1) (now oil absorption number, OAN, ASTM D2414) has been the primary structure indicator in distinguishing different carbon black grades.

The physical characteristics (morphology) of carbon black, such as particle size and structure, affect various processing characteristics and various performance properties of end products, e.g., tires such as tire treadwear, rolling resistance, heat buildup, and tear resistance. Accordingly, different grade carbon blacks are used in different polymeric formulations depending on the specific service requirements of the tires. Various grades of carbon black are also used in various parts of a tire, for example, N100, N200, and N300 series blacks are often used in treads, while N300, N500, N600, and N700 series blacks are often found in sidewalls and carcasses.

Morphological characteristics of carbon black include, for example, particle size/fineness, surface area, aggregate size/structure, aggregate size distribution, and aggregate shape.

Particle size is a measurement of diameter of the primary particles of carbon black. These roughly spherical particles of carbon black have an average diameter in the nanometers range. Particle size can be measured directly via electron microscopy or by indirect surface area measurement. Average particle size is an important factor that determines relative color strength of a carbon black and dispersibility. At equal structure, smaller particle size imparts stronger color and increased difficulty of dispersion. Fineness is a measure of the particle size.

Surface area of carbon black is a function of particle size and porosity. Surface area is measured by gas and liquid phase adsorption techniques and depends on the amount of adsorbent required to form a surface monolayer. Nitrogen surface area (NSA, ASTM D6556) and statistical thickness surface area (STSA, ASTM D6556) are better measures than iodine adsorption number (Iodine no., ASTM D1510) of the true surface area, since they are less influenced by the chemical composition of the carbon black surface. these tests are liquid nitrogen and are based on the original Brunauer, Emmett, and Teller (BET) method, but use a multi-point measurement to exclude the adsorption in the micropores. In a final application, surface area reflects the area accessible to rubber molecules per unit weight of carbon black. High surface area is associated with a high level of reinforcement, but at the expense of more difficult dispersion, processing, and increased hysteresis.

Carbon black particles coalesce to form larger clusters, aggregates, which are the dispersible units of carbon black. Aggregate size is controlled in the reactor. Measurement of aggregate structure can be obtained from electron microscopy or oil absorption. Grades with relative large aggregates are high structure grades which are bulkier, have more void space, and high oil absorptions at given surface areas. The carbon black structure is determined by the shape and size of the carbon black aggregates. High structure carbon black increases rubber compound viscosity, modulus, and conductivity. High structure also reduces die swell, loading capacity, and improves dispersibility. Lower structure blacks give higher elongation, and increased carbon black loading reduces the elongation. If all other features of a carbon black are kept constant, narrow aggregate size distribution increases difficulty of carbon black dispersion and lowers resilience.

Aggregate size distribution (ASD) is a measure of the distribution of the size of carbon black aggregates and has been recognized as one factor important in the reinforcing ability of rubber. Donnet, et al., "Carbon Black Science and Technology," 2nd ed., Marcel Dekker, Inc. New York (1993), pp. 289-347; Jones, "ASTM Committee D24: Keeping the Rubber Industry in the Black," Standardization News (August 1992; updated Melsom, January 1998) http://www.astm.org/COMMIT/CUSTOM1/D24.htm. Broad ASK carbon black shows a tendency to decrease the rolling resistance of tire tread. You, et al., "A New Characterization Method of Tread Carbon Black by Statistical Regression Treatment," DC Chemical Co. Ltd. (Korea) http://www.dcchem.nco.kr/english/product/p petr/image/carbon%20black_at2.pdf. A broad aggregate size distribution will provide a faster carbon black incorporation and improved carbon black dispersibility in a polymeric (e.g., rubber) matrix.

Surface chemistry is a measure of chemisorbed species on the carbon black surface. These organic functional groups can enhance performance of blacks in certain applications.

Processing characteristics of the black and the physical characteristics of the end product, such as cured rubber, are often measured (in addition to characteristics of the carbon black itself) to compare the relative effects of various carbon blacks for a given polymeric test formulation. Processing characteristics include, for example, mixing energy and black incorporation time. End product characteristics include, for example, dispersion index, tear, tensile strength, Mooney viscosity, modulus, DIN abrasion, fatigue, and rebound.

Black incorporation time (BIT) is the time required to incorporate carbon black into a particular polymeric formulation. When carbon black is mixed with rubber, the first step is penetration of rubber into void space, replacing the trapped air and eliminating loose black. this step is called carbon black incorporation. The time required to fill all the voids with rubber is referred to as black incorporation time. A short black incorporation time may reduce actual mixing time and increase mixing equipment throughput.

Dispersion index (DI) is a measurement of the dispersion of the carbon black in a polymeric formulation/cured rubber. Following carbon black incorporation, the aggregates are separated from each other and are dispersed throughout the rubber. The state of dispersion of the carbon black is usually measured by carbon black dispersion index. A poor level of carbon black dispersion may cause premature failure of a final rubber product and less favorable ultimate properties, such as fatigue life, tear strength, and tread wear.

Current commercial grade N200 series carbon blacks, such as N234 and N299, can provide good properties in end products, such as tensile, fatigue, and dynamic properties in a rubber composition, if they are properly dispersed in the rubber matrix. However, the dispersion level of these finer conventional grade carbon blacks can differ depending on the rubber formulation and mixing parameters employed. The performance of a rubber composition with a good carbon black dispersion is superior to the same rubber composition with the same carbon black poorly dispersed. coarser grades such as N300 (and higher numbered) blacks are more easily dispersed but their end product reinforcement characteristics are not as good as the finer blacks, if both are properly dispersed.

Thus, a balancing act between the carbon black grade, rubber formulation (including, e.g., added dispersants), and mixing conditions/time (e.g., greater time and mixing energy for greater dispersion) is required from the rubber compounder. From the standpoint of end product performance, predictability, and operating costs (e.g., energy input and throughput), it is very desirable to be able to engineer carbon blacks to simultaneously provide all of the desired dispersion and performance characteristics.

SUMMARY OF THE INVENTION

The present invention relates to a novel carbon black designed to improve the qualities of tire tread rubber formulations, including improved dispersion. The improved carbon black is in the carbon black with NSA of 100-200 $M^2/g$, and when in rubber, combines the dispersion advantages of coarser blacks with the performance advantages of the finer blacks. The carbon black of the present invention is particularly well suited for improving the qualities of, for example, tread for truck tires.

A carbon black of the present invention has a ratio of an aggregate heterogeneity index (HI) and of a particle size heterogeneity index (HI) greater than about 1.70, wherein the aggregate heterogeneity index (HI and the particle size heterogeneity index (HI) are measured by transmission electron microscopy/automated image analysis (QTM).

A carbon black of the invention can have a statistical thickness surface area (STSA) of about 100 to about 180 $m^2/g$. A carbon black of the invention can also have a nitrogen surface area (NSA) of about 105 to about 200 $m^2/g$. A carbon black of the invention can further have an oil absorption number of a compressed sample (COAN) of about 110 to about 130 ml/100 g. A carbon black of the invention can additionally have a dibutylphthalate oil absorption (DBP) of about 125 to about 140 cc/100 g.

The carbon black has an oil absorption number (OAN) less than about 135 ml/100 g and ($HI_a$) of greater than about 2.3. This carbon black can also be a carbon black with an oil absorption number (OAN) less than about 135 ml/100 g and a DD50 of greater than about 0.07 µm.

The present invention also includes a polymeric composition comprising a carbon black of the present invention.

Another aspect of the invention includes to tires and/or tire components comprising a carbon black of the present invention.

Additional advantages will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION OF A PREFERRED EMBODIMENT

Before the present compounds, compositions, articles, devices, and/or methods are disclosed and described, it is to be understood that the aspects described below are not limited to specific synthetic methods, specific methods as such may, of course, vary. It is also to be understood that the terminology used herein is for the purpose of describing particular aspects only and is not intended to be limiting.

In this specification and in the claims that follow, reference will be made to a number of terms which shall be defined to have the following meanings:

It must be noted that, as used in the specification and the appended claims, the singular forms "a," "an," and "the" include plural referents unless the context clearly dictates otherwise. Thus, for example, reference to "an elastomer" includes mixtures of elastomers, reference to "a rubber" includes mixtures of two or more rubbers, and the like.

"Optional" or "optionally" means that the subsequently described event or circumstance may or may not occur, and that the description includes instances where the event or circumstance occurs and instances where it does not. For example, the phrase "optionally adding curatives" means that the curatives may or may not be added and that the description includes both compositions without curatives and compositions comprising curatives.

Ranges may be expressed herein as from "about" one particular value and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

References in the specification and concluding claims to parts by weight, of a particular element or component in a composition or article, denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the composition.

The current carbonaceous material was invented from a desire to achieve a carbon black with a broad aggregate size distribution, narrow particle size distribution, high surface activity, soft beads to promote improved dispersion, and improved dispersibility in rubber versus conventional N200 blacks, such as N234.

Until now there has generally always been a trade off between dispersion advantages o the coarser blacks and the greater reinforcement characteristics of the finer blacks.

A. Compositions

Carbon Black

A novel carbonaceous material of the present invention can be a carbon black. A carbon black of the present invention is described herein.

Morphology

The morphology of carbon black includes characteristics such as particle size, particle size distribution, surface area, aggregate size/structure, and aggregate size distribution. The primary units of carbon b lack are aggregates, which are formed when particles collide and fuse together in the combustion zone of the reactor. Several of those aggregates may be held together by weak forces to form agglomerates. These agglomerates will break down during mixing into rubber, so the aggregates are the smallest ultimate dispersible unit of carbon black.

Colloidal and morphology values for two representative embodiments of a carbonaceous material, e.g., carbon black, of the current invention are given in Examples 2-4 below.

As shown in the Examples, carbon black of the present invention was made and then measured by various morphological properties. It was also compared head-to-head with various commercial ASTM (N121, N134, N234, N299, and Ne75) and specialty carbon blacks (very high structure N100 and N300s). For conventional carbon black, the aggregate size HI is usually very closely coupled with the particle size HI, i.e. broad aggregate size HI is always associated with broad particle size HI. The present invention dissociates this relationship, wherein a carbon black with a broad aggregate size HI and narrow particle size HI hash been produced. Structure, surface area, tint strength, particle size distribution, and aggregate size distribution were measured, according to the following methods:

| | |
|---|---|
| Oil absorption number, OAN (ml/100 g) | ASTM D2414 |
| Compressed oil absorption number, COAN (ml/100 g) | ASTM D3493 |
| Iodine number, Iodine No. (mg/g) | ASTM D1510 |
| Nitrogen surface area, NSA (M²/g) | ASTM D6556 |
| Statistical thickness surface area, STSA (M²/g) | ASTM D6556 |
| Tint Strength (% ITRB) | ASTM D3265 |
| QTM particle size and aggregate size distribution | ASTM D3849 |
| DCP aggregate size distribution | ISO/DIS 15825 |

Transmission electron microscopy analysis (QTM) (ASTM D3849) was used to analyze particle and aggregate size distributional properties, Table 2. An embodiment of the carbon black material of the present invention has a ratio of an aggregate heterogeneity index (HI) and of a particle size heterogeneity index (HI) greater than about 1.70.

The ratio of QTM-HI of the present carbon black embodiments is unique for N100 and N200 series carbon blacks. The carbon black of the present invention is a carbon black with surface area STSA of 108 m²/g and an oil absorption number (OAN) less than about 135 and an aggregate size HI of greater than about 2.3.

Disk centrifuge photosedimentometry (DCP, ISO/DIS 15825) was also used to analyze aggregate distributional properties, Table 3. The embodiments of carbon black material of the present invention have a DD50/M via DCP of greater than about 0.07 µm. The DD50 can be greater than about 0.075 or 0.08 µm. The carbon black material has a DD50/M of greater than about 0.9. The DD50/M can be greater than about 0.95.

The ratio of QTM-HI of embodiments of the present carbon black is unique for N100 and N200 series carbon blacks. A carbon black of the present invention can have a surface area STSA of about 108 M²/g and an oil absorption number (OAN) less than about 135 Ml/100 g and an aggregate size $HI_a$ of greater than about 2.3. A carbon black of the invention can also be a N200 carbon black with an OAN less than about 135 ml/100 g and a DD50 of greater than about 0.07 µm.

Processing and End Product Characteristics

As shown in the Examples, a carbon black of the present invention was made, incorporated into a polymeric test formulation, and measured for various processing and end product properties. A carbon black of the present invention was also compared head-to-head on the measurements with a conventional N234 carbon black. Examples 5-7 show the results from two embodiments of this carbon black. Black incorporation time, dispersion index, undispersed area fraction, tensile strength, tear, rebound, and DIN abrasion were measured, according to the following methods:

| | |
|---|---|
| Black incorporation time, BIT(s) | Method described in Example 5 |
| Dispersion index, DI | ASTM D2663 |
| Undispersed area fraction (%) | IFM method |
| Tensile strength (MPa) | ASTM D412 |
| Tear (kN/M) | ASTM D624 |
| Rebound (%) | ASTM D1054 |
| DIN abrasion (mm³) | DIN 53 516 |

A carbonaceous material of the present invention, e.g., carbon black, exhibits superior dispersion as measured by surfanalyzer (DI) and by interferometric microscopy (IFM) (undispersed area fraction) and eased dispersion (BIT).

Dispersion of carbon black is typically critical to its performance. Carbon black is optimally dispersed when separated into discrete aggregates. Dispersion involves deagglomeration. Deagglomeration breaks down the agglomerates into aggregates. The amount of energy needed in the dispersion step affects the mixing costs involved in forming the polymeric composition. Dispersibility can also affect overall cost and throughput since longer mixing time delays downstream processing unless additional high capital cost mixers are installed in the line. Addition of dispersants to aid in dispersion also increases cost.

Generally, as one tries to increase tensile strength, modulus, abrasion resistance, and fatigue life of a polymeric (rubber) formulation containing carbon black, the carbon black must be finer. However, the finer carbon black is more difficult to disperse. by instead using a carbon black of the present invention, faster mixing times and better dispersion are achieved while maintaining or increasing hot tear and abrasion properties.

Black incorporation time (BIT) was measured according to the method described in Example 5 using a standard natural rubber/butadiene polymer blend formulation. BIT showed that the embodiments of the carbon black of the current invention in the test formulation (as shown in Example 5) gave faster incorporation times than the conventional N234 black. The particular embodiments tested showed time savings of about 18-20%. This can translate to significant economic savings in processing and increased throughput for a particular mixer, for example, in a tire plant.

Dispersion index (DI) was determined by a surfanalyzer. ASTM D2663-95a, part c; ASTM Standard D2663-95a, "Standard Test Methods for Carbon Black—Dispersion in Rubber," Annu. Book ASTM Stand., 09.01, 447 (2003); P.C. Vegvari, RUBBER CHEM. TECHNOL 51(4), 817 (1978). The dispersion index of the embodiments of the current carbon black in the test formulation was significantly higher than the DI of the conventional N234 black. This shows a more homogeneous rubber composition which translates into better tire performance and less off-spec material to be re-processed or wasted.

Looking at dispersion from the undispersed carbon black side, interferometric microscopy (IFM) (Smith, A. P., et al., "Carbon Black Dispersion Measurement in Rubber Vulcanizates via Interferometric Microscopy," Paper No. 16, Proceedings of the 164th Fall Technical Meeting of the Rubber Division, American chemical Society, Cleveland, Ohio, Oct., 14-17, 2003) showed an undispersed area fraction of the embodiments of the carbon black of the present invention in the test formulation significantly less than the fraction of the conventional N234 black. This again shows a more homogeneous composition which translates into better tire performance and less off-spec material.

A carbon black of the present invention has hot tear and DIN abrasion advantages over conventional blacks of the N200 series, in particular N234.

In-rubber performance properties of a polymeric test formulation were also tested according to standard procedures. This testing showed both an improved die C and hot tear for the compositions comprising a carbon black of the present invention. Improvement in hot tear is very difficult to achieve with conventional carbon blacks. This property is important for how a tire will perform under use conditions, since tires heat up as they roll. Hot tear Tear Die C @100° C., ASTM D624) of the test formulation (shown in Example 6) using carbon b lack of the present invention was improved over the conventional N234 carbon black composition.

These test formulations were also tested for abrasion loss. Abrasion (DIN Abrasion, DIN 53 516) of the test formulation containing embodiments of the carbon black of the present invention was less than that of a conventional N234 carbon black formulation. Abrasion is a measurement of wear of a tire tread.

Production of the Carbon Black

An example of production of a carbon black of the present invention is given below in Example 1 and discussed in the Methods of making section.

Polymeric Compositions

The invention includes a composition comprising a polymer (e.g., elastomer) and a carbon black of the present invention.

Optionally, the polymeric composition can compromise additional components. For example, the composition can comprise curatives, oils, antioxidants, fillers, or a mixture thereof. The choice of additional components and amount of each can be determined by one of skill in the art based on those suitable for a desired application.

Tires are often composed of carbon black reinforced polymer systems that are based on natural rubber (NR) or blends of NR and synthetic polymers (e.g., butadiene rubber (BR)). Among the polymers, e.g., rubbers, suitable for use with the current invention are any natural rubbers, synthetic rubbers, and blends of natural and synthetic. these include, for example, NR, BR, styrene butadiene rubber (SBR), emulsion styrene butadiene rubber (ESBR), solution polymerization styrene butadiene rubber (SSBR), ethylene propylene diene monomer rubber (EPDM), butyl rubber, halobutyl rubber, or a mixture thereof. The choice of and amount of polymer can be determined by one of skill in the art based on those suitable for a desired application.

The amount of a carbon black of the present invention can be determined by one of ordinary skill, for example, from about 40 to about 120 parts per hundred rubber (phr) One of ordinary skill in the art can determine a suitable amount of carbon b lack to use in a particular application as well as a suitable ratio relative to the other components.

A composition of the present invention is improved over compositions comprising conventional carbon black. An improved carbon black of the present invention imparts upon rubber compositions improved processing (e.g., dispersion) characteristics and, when cured, imparts improved performance characteristics, such as hot tear and abrasion.

Tire Tread

The invention includes tires and/or tire components made from a polymeric composition of the present invention which comprises a carbon black of the present invention. Truck tire treads are particularly well suited for production from the improved polymeric compositions comprising a carbon black of the present invention.

Tires and tire components can be made by conventional processes known to one of skill in the art, for example, a tire can be made by forming tire components, assembling tire components, and curing the assembled components in a mold under conditions suitable to form a tire. One of skill in the art can determine appropriate steps and tire components for making a tire for a desired application. Tires of the present invention exhibit improved performance characteristics, such as hot tear and abrasion.

B. Methods

Methods of Making

Carbon black is produced by the partial oxidation or thermal decomposition of hydrocarbon gases or liquids. A broad range of carbon black types can be made by controlled manipulation of the reactor conditions. The carbon black formation reaction in the furnace can be controlled by quenching, such as by steam or water spray. The carbon black particles produced can be conveyed through the reactor, cooled, and continuously collected, such as via filters.

A carbon black material of the present invention can be made using techniques generally known in the carbon black art. One particular method of making the carbon black is described below in Example 1. Variations on this method can be determined by one of skill in the art.

Carbon blacks of the present invention can be produced in a carbon black tread reactor having a combustion section and a reaction section. An example reactor suitable for use in production of the blacks is described generally in U.S. Pat. Nos. 4,927,607 and 5,256,388, the disclosures of which are hereby incorporated by reference in their entireties. Other carbon black reactors can be used. One of skill in the art can determine an appropriate reactor for a particular application. The sections of the reactor need not be distinct physical sections, but can instead be areas within the reactor performing the correct functions. All or part of a hydrocarbon feedstock may be injected into the hot combustion stream from the combustion section. The feedstock can be injected radially or axially to the walls of the reactor. The location of the feedstock injection(s) is generally located upstream of or within the choke section or the reactor. This mixture passes to the reaction zone. A quench section follows which slows and/or stops the reaction. The location of the quench is generally downstream of the exit of the choke section. the reaction is stopped when a carbon black of the present invention has been formed.

After being quenched, the carbon black and gases can be further cooled and separated. Essentially any conventional cooling and separating methods can be used. The separation is often achieved using a bag filter. The carbon black can be further readied for use, storage, or shipping. For example, carbon black is often pelletized using, for example, wet beading. Downstream processing is not critical to carbon blacks of the present invention. one of skill in the art can determine appropriate downstream processing for a particular application.

Feedstock, combustion feeds, and quenching materials are well known in the carbon black art and one example is given below in Example 1. The choice of these feeds is not critical to carbon blacks of the present invention. One of skill in the art can determine appropriate feeds for a particular application. The amounts of feedstock, combustion feeds, and quenching materials can also be determined by one of skill in the art which are suitable for a particular application.

Methods of making a polymeric composition comprising a carbon black of the invention can utilize techniques generally known in the polymer, e.g., rubber, compounding arts. Variations on these methods can be determined by those skilled in the art. Examples 5-6 show examples of compositions which compromise a carbon black of the present invention. The carbon black can be added to the polymer and the combination can be mixed until the carbon black is dispersed to the desired degree. Additional steps and components can be added as determined by one of skill in the art.

Methods of making tires and/or tire components from a polymeric composition comprising a carbon black of the invention can utilize techniques generally known in the tire manufacturing arts. Variations on these methods can be determined by those skilled in the art. tires can be made by conventional processes known to one of skill in the art, for example, by forming tire components, assembling tire components, and curing the assembled components in a mold under conditions suitable to form a tire. One of skill in the art can determine appropriate steps and tire components for making a tire for a desired application.

C. Applications

A carbon black material of the current invention is very useful in polymeric compositions, particularly those used in tire applications. Formulations and mixing recipes are generally known and would be adjusted accordingly based on the improved characteristics of the carbon black. Polymeric compositions made from a carbon black of the present invention have improved processing properties relative to conventional N200 carbon blacks.

Tire treads, especially truck and passenger tire treads, made from the carbon black and polymeric compositions comprising a carbon black of the present invention have improved properties relative to those same components comprising conventional N200 carbon blacks.

EXAMPLES

The following examples are put forth so as to provide those of ordinary skill in the art with a complete disclosure and description of how the compounds, compositions, articles, devices, and/or methods described and claimed herein are made and evaluated, and are intended to be purely exemplary and are not intended to limited the scope of what the inventors regard as their invention. Efforts have been made to ensure accuracy with respect to numbers (e.g., amounts, temperatures, etc.) but some errors and deviations should be accounted for. Unless indicated otherwise, parts are parts by weight, temperature is in ° C. or is at ambient temperature, and pressure is at or near atmospheric. Only reasonable and routine experimentation will be required to optimize such process conditions.

Example 1

Production of Carbon Black of Present Invention

The colloidal properties of 3 conventional commercial ASTM grade blacks (N134, N121, N234, N299 and N375 by Columbian Chemicals Company, Marietta, Ga.) and 2 other specialty grade blacks (CD2005, and CD2038, Columbian Chemicals Company, Marietta, Ga.) were compared to the carbon black of the present invention. The specialty grade blacks were included to show the effect of high structure on the morphology. Based on size and structure, the CD2005 is categorized as fine N200 and CD2038 is categorized as N100, both are very high structure (VHS) blacks.

| Carbon Black | OAN (ml/100 g) ASTM D2414 | COAN (ml/100 g) ASTM D3493 | Iodine No. (mg/g) ASTM D1510 | NSA ($m^2/g$) ASTM D6556 | STSA ($m^2/g$) ASTM D6556 | Tint Strength (% ITRB) ASTM D3265 |
|---|---|---|---|---|---|---|
| N134 | 127 | 103 | 142 | 143 | 137 | 131 |
| N121 | 132 | 111 | 121 | 122 | 115 | 113 |
| N234 | 126 | 98.4 | 121 | 121 | 115 | 125 |
| N299 | 124 | 105 | 108 | 103 | 98 | 113 |
| N375 | 114 | 96 | 90 | 93 | 91 | 114 |
| Sample 1 | 133 | 112 | 110 | 112 | 108 | 115 |
| Sample 2 | 127 | 110 | 109 | 114 | 108 | 115 |
| CD2005 | 175 | 133 | 120 | 120 | 116 | 112 |
| CD2038 | 173 | 132 | 142 | 134 | 124 | 117 |

The reactor was operated at an air load of 12100 Nm$^3$/hr with natural gas fuel at a rate of 733 Nm$^3$/hr and an inlet air temperature of 738° C. Feedstock oil was preheated to 200° C. and was injected radially via 4 Spraying Systems (Wheaton, Ill.) G12W sprays positioned 24 inches upstream from the choke outlet and operating at a pressure of 150 psi. the carbon black formation reaction was quenched via water injected at a position 40 inches downstream from the choke outlet. Product structure was controlled using potassium carbonate at about 80 g/hr injected with the feedstock. The resultant product was wet beaded using sodium lignin sulfonate binder, dried, and collected for packaging.

Example 2

Colloidal Properties Comparison

A head-to-head comparison of the blacks from Example 2 was performed using transmission electron microscopy/automated image analysis (QTM) (ASTM D3849).

TABLE 1

Comparative Colloidal Properties.

| Carbon Black | OAN (ml/100 g) ASTM D2414 | COAN (ml/100 g) ASTM D3493 | Iodine No. (mg/g) ASTM D1510 | NSA (m$^2$/g) ASTM D6556 | STSA (m$^2$/g) ASTM D6556 | Tint Strength (% ITRB) ASTM D3265 |
|---|---|---|---|---|---|---|
| N134 | 127 | 103 | 142 | 143 | 137 | 131 |
| N299 | 124 | 105 | 108 | 103 | 98 | 113 |
| N234 | 126 | 98.4 | 121 | 121 | 115 | 125 |
| N121 | 132 | 111 | 121 | 122 | 115 | 113 |
| N375 | 114 | 96 | 90 | 93 | 91 | 114 |
| Sample 1 | 133 | 112 | 110 | 112 | 108 | 115 |
| Sample 2 | 127 | 110 | 109 | 114 | 108 | 115 |
| CD2005 | 175 | 133 | 120 | 120 | 116 | 112 |
| CD2038 | 173 | 132 | 142 | 134 | 124 | 117 |

OAN = oil absorption number
COAN = compressed oil absorption number
NSA = nitrogen surface area
STSA = statistical thickness surface area
ITRB = industry tint reference black

TABLE 2

QTM Aggregate Size Distributional Properties.

| | Particle size | | | | Aggregate size | | | | | Age HI/ |
|---|---|---|---|---|---|---|---|---|---|---|
| | M | SD | WM | HI | M | SD | WM | HI | V'/V | PS HI |
| N134 | 16.4 | 6.8 | 25.8 | 1.58 | 51.0 | 34.0 | 116 | 2.26 | 2.12 | 1.43 |
| N121 | 20.0 | 7.7 | 29.3 | 1.47 | 52.6 | 37.4 | 131 | 2.48 | 2.10 | 1.69 |
| N234 | 19.4 | 7.4 | 28.4 | 1.47 | 73.5 | 47.5 | 157 | 2.14 | 2.45 | 1.46 |
| N299 | 24.7 | 9.1 | 35.7 | 1.44 | 66.1 | 40.4 | 142 | 2.15 | 1.97 | 1.49 |
| N375 | 23.4 | 8.4 | 33.1 | 1.42 | 82.1 | 44.3 | 158 | 1.93 | 1.95 | 1.36 |
| Sample 1 | 20.6 | 8.0 | 30.0 | 1.46 | 69.1 | 49.9 | 174 | 2.52 | 2.38 | 1.73 |
| Sample 2 | 20.6 | 9.2 | 31.4 | 1.53 | 61.8 | 46.0 | 170 | 2.76 | 2.50 | 1.80 |
| CD2038 | 20.7 | 7.4 | 29.5 | 1.43 | 69.0 | 43.7 | 164 | 2.38 | 2.65 | 1.66 |
| CD2005 | 19.7 | 7.6 | 29.5 | 1.50 | 70.0 | 50.4 | 172 | 2.46 | 2.42 | 1.64 |

"M" stands for Mean Particle or Aggregate Size and it represents the Number Average Particle or Aggregate Diameter and its unit for Carbon Black is Typically Expressed as nanometers, nm; Mathematically it is Defined as the Sum of all Particle or Aggregate Diameters ($\Sigma f_i d_i$) Divided by the Total number of Particles or Aggregates ($f_t$), so $$M = \Sigma f_i d_i / f_t$$

"SD" stands for Standard Deviation and it represents the Breadth of the Particle or Aggregate Size Distribution (or Spread of the Distribution) and its unit for Carbon Black is Typically Expressed in nanometers, nm; Mathematically it is Defined as the Spread or Variability of the Data, so $$SD = |\Sigma f_i (d_i - d)^2 / (f_t - 1)|$$

"WM" stands for Weight Mean Particle or Aggregate Size and it represents the Weight Average Particle or Aggregate Diameter and its Unit for Carbon Black is Typically Expressed in nanometers, nm; Mathematically it is Defined as the Point that Divides the Particle or Aggregate Size Distribution into Equally Weighted Halves, so $$WM = \Sigma f_i d_i^4 / \Sigma f_i d_i^3$$

"V'V" stands for Aggregate Absorptivity Factor and it Represents the Relative Total Aggregate Void Volume and Indicates the Absorptive Capacity of the Aggregate Relative to its Own Volume (a V'V of 2.0 means the Aggregate can Absorb up to Twice its Own Volume of Oil or Polymer or Other Absorptive Material). This term is Unitless as it is a Relative Ratio of Two Volumes. Mathematically it is Defined as the Volume of the Equivalent Sphere ($V_{ES}$) Surrounding the Aggregate minus the Volume of the Aggregate ($V_{agg}$) Divided by the Volume of the Aggregate, so $$V'/V = (V_{ES} - V_{agg}) / V_{agg}$$

Where $V_{ES}$ is the Volume of the Equivalent Sphere based on the Average Aggregate Diameter, and Vagg is the Volume of the Aggregate Calculated as $V_{agg} = 8/3(A^2/P)$, where A=Two Dimensional Projected Area of the Carbon Black Aggregate and P is Equal to the Perimeter of the Two Dimensional Projected Area of the Carbon Black Aggregate.

This shows that for ASTM grade carbon blacks, the aggregate size HI is usually very closely coupled with the particle size HI, i.e., broad aggregate size HI is always associated with broad particle size HI. The present invention dissociates this relationship, wherein a carbon black with a broad aggregate size HI and narrow particle size HI has been produced.

Example 3

DCP Comparison

A head-to-head comparison of the blacks from Example 2 was performed using disc centrifuge photosedimentometry (DCP) (ISO/DIS 15825).

TABLE 3

DCP Aggregate Size Distributional Properties.

| Sample | Range (μm) | Weight average (μm) | Mode (μm) | ΔD50 (μm) | ΔD50/M |
|---|---|---|---|---|---|
| N234 | 0.033~0.805 | 0.079 | 0.07 | 0.059 | 0.847 |
| N121 | | 0.094 | 0.0801 | 0.069 | 0.85 |
| N299 | | 0.105 | 0.087 | 0.067 | 0.77 |
| Sample 1 | 0.033~0.446 | 0.102 | 0.087 | 0.083 | 0.957 |
| Sample 2 | 0.034~0.471 | 0.102 | 0.0084 | 0.089 | 1.056 |
| CD2005 | | 0.110 | 0.100 | 0.081 | 0.814 |
| CD2038 | | 0.102 | 0.092 | 0.079 | 0.855 |
| CD2056 | | 0.107 | 0.099 | 0.088 | 0.892 |
| CD2079 | | 0.122 | 0.110 | 0.095 | 0.865 |

ΔD50 = full width at half height of the differential curve
ΔD50/M = ratio of ΔD50 and mode The broadest aggregate distribution as measured by ΔD50/M was found with carbon black of the present invention regardless of structure or particular size.

Example 4

Dispersion Comparison

Carbon black of the present invention was evaluated against a N234 control for incorporation time and dispersion in a natural rubber (NR)/butadiene rubber (BR) blend. Mixing was done using a Brabender R2000 mini-mixer.

The BIT test method was as follows:
1. Switch on the heating for the mixer and allow the mixer to warm up and stabilize to 60° C., preferably overnight.
2. Weigh out the samples to be tested to the recipe in Table 4, including a warm up batch. For best results, duplicate mixes should be used, mixed in random order. The initial batch is to clean out and heat the mixing chamber only and the compound and mixer torque output should be discarded.
3. Repeat the following stages to mix all samples, including the warm up batch:

| | |
|---|---|
| a. Add rubber | 0 s |
| b. Ram up, add black and curatives | 30 s |
| c. Ram down | 60 s |
| d. Dump | 180 s |
| e. Clean out mixer and allow to cool to 60° C. | |

Figure 1:
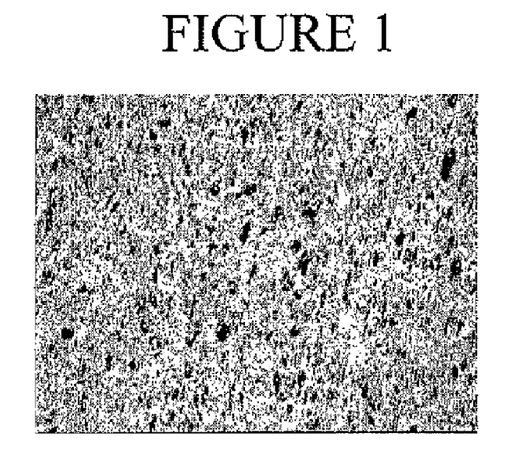
FIG. 1 shows a TEM of a conventional N234 carbon black dispersed within the cured rubber formulation of Example 5.
Figure 2:
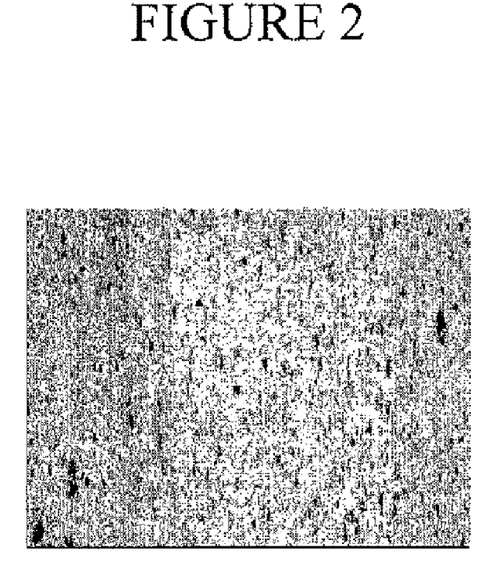
FIG. 2 shows a TEM of a carbon black of the current invention dispersed within the cured rubber formulation of Example 5.
Figure 3:
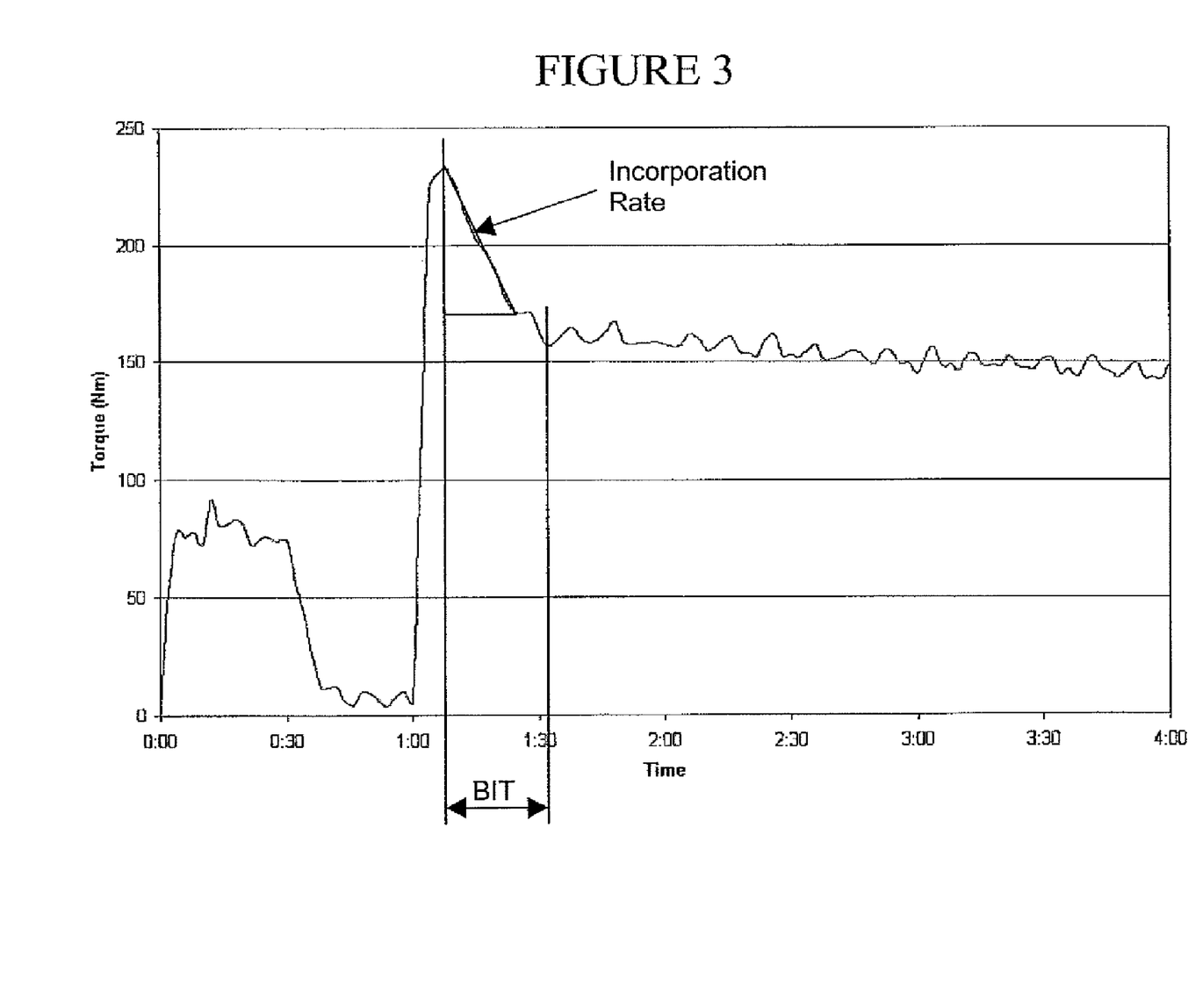
FIG. 3 shows an example mixer torque trace for the black incorporation time (BIT) method used in Example 5.

4. Record mixer torque while mixing. See, e.g., FIG. 3 for example torque trace.
5. From the measured torque trace, find the time at which the minimum torque occurs (see, e.g., FIG. 3). For the purposes of these tests, a polynomial was fitted through the duplicate data sets and the time for the mathematical minima calculated.
6. Calculate the BIT, defined as the time from ram down (60 s) to the time of the initial minimum, $$\text{BIT} = T_{min} - T_{ram} \qquad \text{a.}$$

Black incorporation time (BIT) testing was done using a standard NR/BR blend with carbon black and curatives (to enable curing of samples for dispersion testing).

TABLE 4

Test Formulation

Master Batch-phr (parts per hundred rubber)

| | phr |
|---|---|
| Natural rubber | 60 |
| Butadiene rubber | 40 |
| Carbon black | 55 |
| Sulfur | 1.5 |
| MBS | 1.50 |

Mini-Mixer

| | |
|---|---|
| Start temp | 60 |
| Rotor speed | 60 |
| Fill factor | 70% |

MBS = oxydiethylene benzothiazole-2-sulfenamide

TABLE 5

Incorporation results.

| Parameter | Standard N234 | Sample 1 | Sample 2 |
|---|---|---|---|
| BIT (s) | 66.2 | 54.3 | 53.3 |

The measurements are given as time in seconds to minimum torque (BIT). the data indicates that a black of the present invention achieves faster incorporation versus the standard N234 grade.

Carbon black of the present invention was found to have a faster incorporation time and an improved dispersion relative to the N234 control. Carbon black of the present invention had a significantly [how much is significantly?] larger secondary incorporation peak compared to the N234 control.

TABLE 6

Dispersion results.

| Parameter | Standard N234 | Sample 1 | Sample 2 |
|---|---|---|---|
| DI, Dispersion Index | 61.5 | 88.3 | 86.5 |
| Undispersed area fraction, % | 26.2 | 14.5 | 14.7 |

DI was determined by a surfanalyzer ASTM D2663-95a, part c; ASTM Standard D2663-95a, "Standard Test Methods for Carbon Black—Dispersion in Rubber," Annu. Book ASTM Stand., 09.01, 447 (2003); P. C. Vegvari, Rubber chem. Technol., 51(4), 817 (1978).

Undispersed area fraction was determined by interferometric microscopy (IFM) Smith, A. P., et al., "Carbon Black Dispersion Measurement in Rubber Vulcanizates via Interferometric Microscopy," Paper No. 16, Proceedings of the 164th Fall Technical Meeting of the Rubber Division, American Chemical Society, Cleveland, Ohio, Oct. 14-17, 2003.

The results show a substantial [how much is substantial?] improvement in the dispersion level for the carbon black of the present invention versus the standard N234.

Example 5

In-rubber Performance Properties Comparison

The in-rubber performance properties of the formulations using carbon black of the present invention and conventional N234 were tested and compared. The properties tested included tensile strength, modulus, elongation, hardness, hysteresis (HBU/Zwick), and hot tear.

TABLE 7

Test Formulation.

| | Phr (parts per hundred rubber) |
|---|---|
| Natural rubber | 60 |
| Polybutadiene rubber | 40 |
| Carbon black | 55 |
| Zinc oxide | 4 |
| Stearic acid | 2 |
| 6PD | 2 |
| TMQ | 1 |
| Wax | 1 |
| Finish | 165 |
| TBBS | 1.1 |
| Sulfur | 1.8 |

TABLE 8

Mixing Procedure

| Ram up/ram down Time (s) | Step |
|---|---|
| /0 | Rubber added |
| 30/45 | Chemicals, ½ black added |
| 70/85 | ½ black added |
| 110/130 | Sweep |
| 170 | Dump |

TABLE 9

In-rubber cured properties.

| Property Tensile | N234 | Sample 1 | Sample 2 |
|---|---|---|---|
| 100% Modulus, MPa | 3.3 | 3.7 | 3.5 |
| 200% Modulus, MPa | 8.2 | 9.8 | 9.0 |
| 300% Modulus, MPa | 14.7 | 17.0 | 15.8 |
| Tensile strength, MPa | 27.3 | 28.1 | 28.4 |
| Elongation at break, % | 500 | 480 | 500 |
| Hardness, Shore A | 69.9 | 70.7 | 69.3 |
| Tear Die C @ room temperature | 67.5 | 77.4 | 70.9 |
| Tear Die C @ 100° C. | 50.2 | 55 | 54 |
| Zwick Rebound, % | 53.6 | 56.2 | 56.2 |
| HBU, ° C. | 59.7 | 60 | 59.8 |

Normally, blacks which are coarser or have higher structure have a decreasing tear. However, the present carbon black with coarser particles and higher structure than N234 gave higher tear strength than N234. It is believed that this increased tear is a result of better carbon black dispersion.

Example 6

Abrasion Testing Comparison

The DIN abrasion (DIN 53 516) of the Example 6 formulations using carbon black of the present invention and N234 were tested and compared. A lower abrasion number herein corresponds to better wear characteristics.

TABLE 10

DIN abrasion results.

| | DIN Abrasion (mm$^3$) | Standard Deviation (mm$^3$) |
|---|---|---|
| N234 | 65.9 | 0.72 |
| Sample 1 | 61.1 | 2.05 |
| Sample 2 | 63.6 | 2.09 |

In an additional embodiment of the present invention, reference is made to the material set forth below which indicates the difference in performance of CD2110 modified versus the previous version of CD2110 and the standard grade N134.

Sample Description

| E-Number | Description | Source | Received Date |
|---|---|---|---|
| 27810 | N134 A6 Standard | ECL | 27 Jun. 2006 |
| 29431 | CD2110 | North Bend | 27 Jun. 2006 |
| 29432 | CD2110 Lot 65026 3D 2018 | CCK | 27 Jun. 2006 |
| 29433 | CD2110 Lot 60526 3D 2002 | CCK | 27 Jun. 2006 |

Results and Discussion

The colloidal data (Table 11) shows that the modified version of CD2110 had the targeted properties of increased structure (OAN and COAN) together with an increased surface area and reduced porosity versus the previous.

TABLE 11

Colloidal Data CD2110

| | North Bend | CCK Lot 65026 3D 2018 | CCK Lot 60526 3D 2002 | A6 N134 |
|---|---|---|---|---|
| OAN, mL/100 g | 130.8 | 137.3 | 136.6 | |
| COAN, mL/100 g | 116.2 | 188.6 | 188.2 | |
| NSA, m$^2$/g* | 140.2 | 138.4 | 138.8 | 142.9 |
| STSA, m$^2$/g* | 123.6 | 127.2 | 127.9 | 134.9 |
| Tint, % ITRB | 117.6 | 122.3 | 122.3 | |
| Transmission, % T | 99.1 | 90.9 | 92.4 | |
| Iodine, mg/g | 142.7 | 146.1 | 146.1 | |

The incorporation testing (Table 12) was done as per the guidelines in the draft patent application. The results show both CD2110 products to be superior to the N134 as expected. The new version of CD2110 had a slightly longer BIT time versus the old version which is also expected from the modified colloidal properties (increased surface area and increased structure).

TABLE 12

Incorporation results

| Parameter | Standard N134 | CD2110 NB | CD2110 CCK |
|---|---|---|---|
| BIT(s) | 53.5 | 43.0 | 46.8 |

Dispersion data (Table 13) shows that the CD2110 versions were both superior to the N134 with the modified CD2110 having slightly poorer dispersion versus the old version. Again these results reflect the modified colloidal properties.

TABLE 13

Dispersion results

| Parameter | Standard N134 | CD2110 NB | CD2110 CCK |
|---|---|---|---|
| DI, Dispersion Index | 63.0 | 87.5 | 81.5 |
| Undispersed area fraction, % | 34.2 | 12.5 | 22.8 |

In rubber properties (Table 14) show higher static modulus levels and hardness for the CD2110 products versus the N134, with associated reductions in elongation at break. There was also a reduction in TS for the CD2110 products. The CD2110 products gave equivalent tear performance versus the N134, presumably due to increased dispersion. The rebound of the CD2110 products was higher than the N134 and the heat build up was similar.

TABLE 14

In-rubber cured properties

| Property | Standard N134 | CD2110 NB | CD2110 CCK |
|---|---|---|---|
| 100% Modulus, MPa ASTM D412 | 2.96 | 3.64 | 4.01 |
| 200% Modulus, MPa | 7.42 | 9.25 | 10.13 |
| 300% Modulus, MPa | 13.53 | 15.55 | 16.81 |
| Tensile Strength, MPa | 26.21 | 24.92 | 25.43 |
| Elongation at break, % ASTM D412 | 514 | 463 | 441 |
| Hardness, Shore A ASTM D2240 | 71.4 | 73.1 | 73.3 |
| Tear Die C @ room temp., kN/M ASTM D624 | 96.2 | 98.1 | 101.2 |
| Tear Die C @ 100%, kN/M ASTM D624 | 59.7 | 56.1 | 59.5 |
| Zwick Rebound, % ASTM D1054 | 48.3 | 50.6 | 50.7 |
| HBU, ° C. ASTM D623 | 70.3 | 70.6 | 70.2 |

The DIN abrasion data (Table 15) indicates improved abrasion for both CD2110 types versus the N134 standard. There was a slight improvement in abrasion for the new CD2110 type.

TABLE 15

DIN abrasion results

| | DIN Abrasion (mm³) | Standard Deviation (mm³) |
|---|---|---|
| Standard N134 | 77.1 | 2.29 |
| CD2110 NB | 72.0 | 0.87 |
| CD2110 CCK | 70.1 | 1.50 |

Experimental

Testing was carried out according to the following procedures:

| Test | Test Description | Test Date |
|---|---|---|
| Mooney Viscosity | ASTM D1646: 1996 | July 2006 |
| MDR | ASTM D5289: 1995 | July 2006 |
| Zwick Rebound | ECL6-21 (based on ISO 4662) | July 2006 |
| Shore A Hardness | ASTM D2240: 1995 | July 2006 |
| DIN Abrasion | DIN 53 516 | July 2006 |
| Tensile Properties* | ASTM D412: 1992 (Humidity: Ambient to 70%) | July 2006 |
| Dynamic Characterization | ECL6-22 | July 2006 |
| Trouser Tear | In House-Tested at NACL & ECL | July 2006 |
| Dispersion | ASTM D2663: 1995, Method C | July 2006 |

Throughout this application, various publications are referenced. the disclosures of these publications in their entireties are hereby incorporated by reference into this application in order to more fully describe the compounds, compositions and methods described herein.

Various modifications and variations can be made to the compounds, compositions, and methods described herein. Other aspects of the compounds, compositions, and methods described herein will be apparent from consideration of the specification and practice of the compounds, compositions and methods disclosed herein. It is intended that the specification and examples be considered as exemplary.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A carbonaceous material with a ratio of an aggregate size heterogeneity index ($HI_a$) and of a particle size heterogeneity index ($HI_p$) ($HI_a/HI_p$) via QTM greater than about 1.70.

2. The carbonaceous material of claim 1 wherein the carbonaceous material is carbon black.

3. A carbon black with a $HI_a/HI_p$ via QTM greater than about 1.70 and a $HI_p$ via QTM less than about 1.6.

4. The carbon black of claim 3 wherein the carbon black has a statistical thickness surface area (STSA) of about 100 to about 180 $M^2/g$.

5. The carbon black of claim 3 wherein the carbon black has a nitrogen surface area (NSA) of about 105 to about 200 $M^2/g$.

6. The carbon black of claim 3 wherein the carbon black has an oil absorption number of compressed sample (COAN) of about 110 to about 130 Ml/100 g.

7. The carbon black of claim 3 wherein the carbon black has an STSA of about 100 to about 180 $M^2/g$, a NSA of about 105 to about 200 $M^2/g$, a COAN of about 110 to about 130 Ml/100 g, and a DBP of about 125 to about 140 cc/100 g.

8. The carbon black of claim 3 wherein when the carbon black is incorporated into an elastomeric composition, the dispersibility of the elastomeric composition is improved compared to the same elastomeric composition having conventional carbon black with similar particle size.

9. The carbon black of claim 3 wherein when the carbon black is incorporated into an elastomeric composition and the composition subsequently cured, the hot tear of the cured elastomeric composition is improved compared to the same cured elastomeric composition having conventional carbon black with similar particle size.

10. The carbon black of claim 3 wherein said carbon black is incorporated into an elastomeric composition, and the composition subsequently cured the abrasion of the cured elastomeric composition is improved compared to the same cured elastomeric composition having conventional carbon black with similar particle size.

11. The carbon black of claim 3 with a ΔD50/M greater than about 0.9.

12. The carbon black of claim 3 with a ΔD50/M via DCP greater than about 0.07 μm.

13. The carbon black of claim 3 with an oil absorption number (OAN) of less than about 135 ml/100 g.

14. A polymeric composition comprising a polymer and a carbon black with a ratio of an aggregate size heterogeneity index ($HI_a$) and of a particle size heterogeneity index ($HI_p$) ($HI_a/HI_p$) via QTM greater than about 1.70.

15. The polymeric composition of claim 14 wherein the polymer comprises rubber.

16. A polymeric composition comprising a polymer and a carbon black with a $HI_a/HI_p$ via QTM greater than about 1.70 and $HI_p$ via QTM less than about 1.6.

17. The polymeric composition of claim 16 wherein the polymer comprises rubber.

18. A tire tread comprising the polymeric composition of claim 14.

19. A tire comprising the polymeric composition of claim 14.

20. A carbonaceous material with a ratio of an aggregate heterogeneity index (HI) and of a particle size heterogeneity index (HI) via QTM greater than about 1.70.

21. The carbonaceous material of claim 20 wherein the carbonaceous material is carbon black.

22. A carbon black with a ratio of an aggregate heterogeneity index (HI) and of a particle size heterogeneity index (HI) via QTM greater than about 1.70, and a particle size HI via QTM less than 1.5.

23. The carbon black of claim 22 wherein the STSA is 100-180 $M^2/g$, the NSA is 150-200 $M^2/g$, the COAN is 110-130 cc/100 g, the DBP is 125-140 cc/100 g and a ratio of an aggregate heterogeneity index (HI) and of a particle size heterogeneity index (HI) via QTM greater than about 1.70.

24. The carbon black of claim 22 wherein the particle size HI is less than 1.5.

25. The carbon black of claim 22 wherein when said carbon black is incorporated into an elastomeric composition, the dispersibility of the elastomeric composition is improved compared to the same elastomeric composition having conventional carbon black with similar particle size.

26. The carbon black of claim 22 wherein when said carbon black is incorporated into an elastomeric composition and the composition subsequently cured, the hot tear of the cured elastomeric composition is improved compared to the same cured elastomeric composition having conventional carbon black with similar particle size.

27. The carbon black of claim 22 wherein when said carbon black is incorporated into an elastomeric composition, and the composition subsequently cured the abrasion of the cured elastomeric composition is improved compared to the same cured elastomeric composition having conventional carbon black with similar particle.

* * * * *